US006054530A

United States Patent [19]

Webb et al.

[11] Patent Number: 6,054,530

[45] Date of Patent: Apr. 25, 2000

[54] CONTINUOUS PROCESS FOR THE PREPARATION OF POLY(VINYL ACETATE) FOR POLY(VINYL ALCOHOL) PRODUCTION

[75] Inventors: Stephen Charles Webb, Emmaus; James Francis Nangeroni, Doylestown, both of Pa.; Brian Thomas Carvill, Houston, Tex.; Beth Ann Frey, Alburtis, Pa.

[73] Assignee: Air Products and Chemicals, Inc., Allentown, Pa.

[21] Appl. No.: 09/038,544

[22] Filed: Mar. 11, 1998

[51] Int. Cl.$^{7}$ .......... C08F 8/00

[52] U.S. Cl. .......... 525/62; 159/47.1; 523/343

[58] Field of Search .......... 525/62; 159/47.1; 523/343

[56] References Cited

U.S. PATENT DOCUMENTS

| | | | |
|---|---|---|---|
| 4,198,265 | 4/1980 | Johnson | 159/47 |
| 4,493,807 | 1/1985 | Vyvial et al. | 264/101 |
| 5,028,648 | 7/1991 | Famili et al. | 524/317 |
| 5,051,222 | 9/1991 | Marten et al. | 264/143 |
| 5,084,134 | 1/1992 | Mattiussi et al. | 159/47.1 |
| 5,635,568 | 6/1997 | Plochocka et al. | 525/362 |

FOREIGN PATENT DOCUMENTS

| | | |
|---|---|---|
| 0054716 | 6/1982 | European Pat. Off. . |
| 2567894 | 1/1986 | France . |

OTHER PUBLICATIONS

*Devolatilization of Polymers,* edited by J. A. Biesenberger (Hanser, 1983), pp. 65–85.

"Devolatilization," by J. A. Biesenberger, in Encyclopedia of Polymer Science and Engineering, 2d ed., vol. 4, pp. 745–751 (Wiley–Interface, 1985).

*Polymer Handbook,* 3$^{rd}$ ed., edited by J. Brandrup and E. H. Innergut. Wiley, 1989, p. V/71

*Primary Examiner*—Judy M. Reddick
*Attorney, Agent, or Firm*—Mary E. Bongiorno

[57] ABSTRACT

An improved process for the continuous production of poly(vinyl alcohol) which involves purifying poly(vinyl acetate) paste exiting from a polymerization reactor and dissolving the substantially pure poly(vinyl acetate) in a hydrolytic alcohol-containing solvent for subsequent saponification to produce poly(vinyl alcohol). Poly(vinyl acetate) paste, containing poly(vinyl acetate), vinyl acetate, and solvent, is heated to a temperature above the glass transition temperature but below a temperature which will degrade the poly(vinyl acetate) and is fed into a flashing area of an extruding devolatilization device. Vinyl acetate and solvent are flashed through vent ports in the flashing area of the devolatilization device and can then be recycled to a polymerization reactor, if desired. A substantially pure poly (vinyl acetate) melt, exiting the flashing area, is conveyed to a mixing area of the devolatilization device where it is mixed with a hydrolytic alcohol-containing solvent to form a solution for subsequent processing in a saponification unit.

10 Claims, 3 Drawing Sheets

CONTINUOUS PROCESS FOR THE PREPARATION OF POLY(VINYL ACETATE) FOR POLY(VINYL ALCOHOL) PRODUCTION

BACKGROUND OF THE INVENTION

The complete removal and recycling of solvent and unreacted vinyl acetate monomer from poly(vinyl acetate), during the production of poly(vinyl acetate), is a complex and energy-intensive process. However the complete removal of vinyl acetate is particularly important in subsequent processing of the poly(vinyl acetate) to produce poly(vinyl alcohol). For example, residual vinyl acetate in the saponification of poly(vinyl acetate) to produce poly (vinyl alcohol) causes discoloration in the poly(vinyl alcohol).

In order to better understand the problems in removing vinyl acetate from the poly(vinyl acetate), a brief description of a process for producing poly(vinyl acetate) to be used in poly(vinyl alcohol) production is given below.

Poly(vinyl acetate) for poly(vinyl alcohol) production is typically produced by the reaction of vinyl acetate in methanol in stages in a plurality of polymerization zones. However, other solvents for the polymerization reaction, such as tert-butanol, have been reported in the literature. The extent of the reaction in the polymerization zones and the molecular weight of the poly(vinyl acetate) are critically dependent on the ratio of solvent to vinyl acetate. Reactor effluent consists of poly(vinyl acetate) containing solvent and unreacted vinyl acetate, and is referred to as poly(vinyl acetate) paste. Traditionally, the solvent and unreacted monomer have been removed from the poly(vinyl acetate) paste by feeding it into the top of a stripping column. A stream of hot solvent vapor is fed into the bottom of the column to strip the unreacted vinyl acetate from the paste. The paste can be diluted with additional solvent before being fed into the column. A vinyl acetate-containing solvent stream exits from the top of the stripping column while the bottoms, containing poly(vinyl acetate) and solvent and essentially free of vinyl acetate, are fed to saponification units. Since careful control of solvent is required in the polymerization zone to control the molecular weight of the poly(vinyl acetate) for many molecular weight products, solvent must be separated from the vinyl acetate before recycling the vinyl acetate. This involves a complicated distillation process. Therefore, alternative methods of removing and recycling solvent and unreacted monomer from poly(vinyl acetate) have been of continuing interest in the industry.

Other problems in this process scheme relate to the use of the solution of poly(vinyl acetate) in solvent, from the stripping column, in the saponification process. Saponification, as used herein, refers to alkaline-catalyzed transesterification of poly(vinyl acetate) with an alcohol; typically methanol. The presence of residual amounts of unreacted vinyl acetate in the poly(vinyl acetate)/methanol stream which exits the stripping column can cause discoloration of the saponification product. In addition, because of the stripping process, high polymer concentrations are not feasible. However, higher polymer concentrations is sometimes desirable for the saponification process.

The need remains for a method of completely removing residual vinyl acetate after polymerization of the vinyl acetate and of better controlling the ratio of poly(vinyl acetate) to alcohol which is then reacted in a saponification process.

The use of extruders to remove volatiles from polymers is known. For example, there is a description of the use of single-screw and twin-screw extruders in the devolatilization of polymers in *Devolatilization of Polymers*, edited by Joseph A. Biesenberger (Hanser, 1983), pages 65 to 85. In addition, several patents, such as U.S. Pat. No. 4,198,265 (Johnson, 1980), disclose use of extruders for removing volatiles from polymers. However, incorporation of extruder technology into vinyl acetate polymerization processes in order to recycle solvent and unreacted monomers, without adding more solvent, and to subsequently disperse and dissolve the poly(vinyl acetate) in a hydrolyzing solvent, has not been reported.

BRIEF SUMMARY OF THE INVENTION

This invention is directed to an improved process for producing poly(vinyl alcohol) from poly(vinyl acetate) in which substantially all vinyl acetate monomer and solvent is removed from poly(vinyl acetate) paste obtained from the polymerization of vinyl acetate in a solvent, such as methanol, and the purified poly(vinyl acetate) is dissolved in an alcoholic solvent prior to saponification. Saponification, as used herein, refers to alkaline-catalyzed transesterification of poly(vinyl acetate) with an alcohol; preferably methanol.

Heated poly(vinyl acetate) paste, exiting from a vinyl acetate polymerization process and containing poly(vinyl acetate), vinyl acetate, and solvent, is fed into a flashing area of an extruding devolatilization apparatus, such as an extruder. The temperature of the paste is maintained above the glass transition temperature (28° C.) but below a temperature at which poly(vinyl acetate) will decompose or degrade, in order to vaporize vinyl acetate and solvent and retain a poly(vinyl acetate) melt. The vaporized vinyl acetate and solvent are flashed through one or more vent ports in the flashing area. A substantially pure poly(vinyl acetate) melt is conveyed from the flashing area to a mixing area of the extruding devolatilization apparatus and forms a seal between the flashing and mixing areas. A hydrolytic alcohol-containing solvent is then mixed with the poly(vinyl acetate) melt to form a homogenous solution for use in the saponification process.

Several benefits for processing the poly(vinyl acetate) and subsequently converting it to poly(vinyl alcohol) are realized with this improved process:

Solvent and unreacted monomer can be removed from poly(vinyl acetate) exiting the polymerization process without adding additional solvent and without using a separate stripper column;

The unreacted monomer and solvent can be immediately recycled into a polymerization unit, thus avoiding a costly separation unit;

There is better control of solvent, and hence better control of molecular weight, during the production of poly (vinyl acetate);

Dissolution of the purified poly(vinyl acetate) in a solvent is facilitated;

A hydrolytic alcohol or a hydrolytic alcohol-containing solvent, other than methanol or other solvent used in the polymerization of poly(vinyl acetate), can be used to dissolve the poly(vinyl acetate), if desired;

Purification of the poly(vinyl acetate) paste and solubilizing the purified poly(vinyl acetate) melt can be carried out in the same apparatus; and The level of solids in the alcoholic solution of poly(vinyl acetate), which is transferred to the saponification process, can be controlled at a higher level compared with conventional processes.

DETAILED DESCRIPTION OF THE INVENTION

Figure 1:
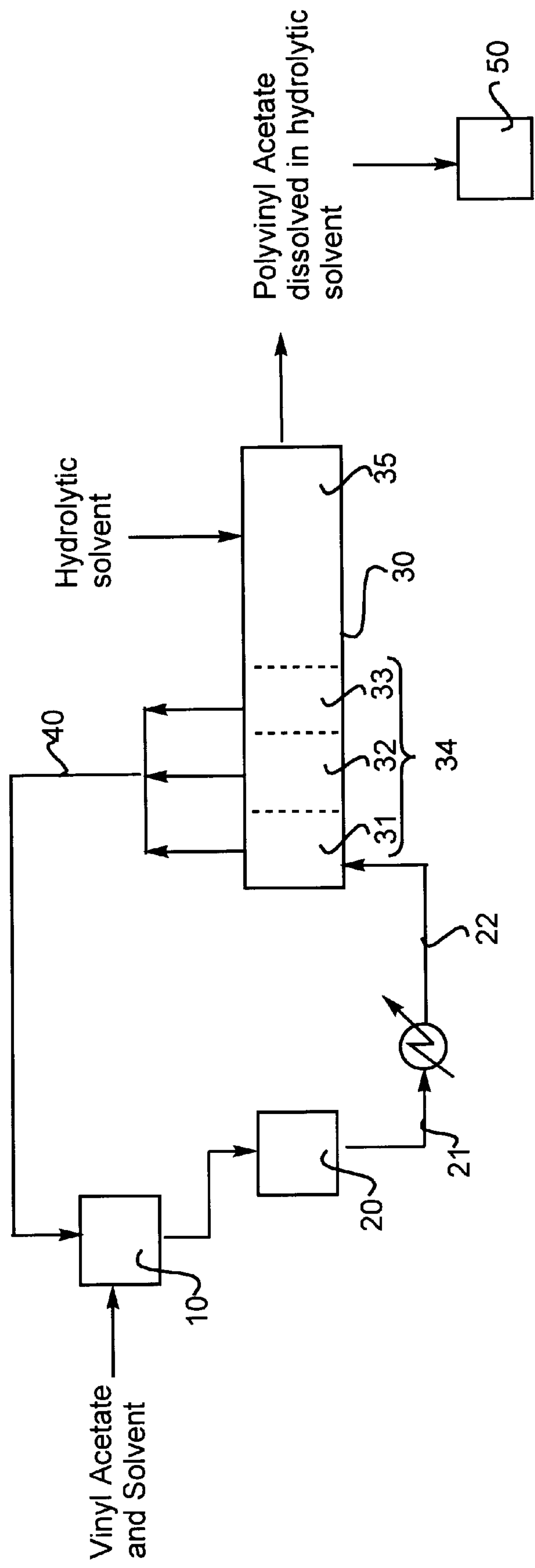
FIG. 1 is a schematic diagram of an embodiment of this invention in which, following polymerization of vinyl acetate, substantially all unreacted vinyl acetate and solvent are removed from poly(vinyl acetate) paste exiting the polymerization reactors and are recycled into a polymerization reactor. The substantially pure poly(vinyl acetate) melt is dissolved in a hydrolytic alcohol-containing solvent before transfer to a saponification process.

In the manufacture of poly(vinyl alcohol), poly(vinyl acetate) paste, exiting from a polymerization process and containing unreacted vinyl acetate monomer and a solvent, such as methanol or tert-butanol, is purified by conveying the paste into a flashing area of a devolatilization apparatus, such as an extruder or other appropriate device, at a temperature which vaporizes the solvent and the unreacted monomer contained in the paste and is above the glass transition temperature but is below a temperature which will decompose the poly(vinyl acetate) and flashing the solvent and unreacted monomer vapors. The flashed monomer and solvent vapors can be recycled into a polymerization reactor and the substantially pure poly(vinyl acetate) melt is conveyed to a mixing area so that the poly(vinyl acetate) forms a seal between the mixing area and the flashing area; thus enabling dissolution of the poly(vinyl acetate) melt in an appropriate solvent without affecting the devolatilization process. The purified poly(vinyl acetate) is mixed with a hydrolytic alcohol-containing solvent to form a homogenous solution and then transferred to a saponification process. This process can be run as a continuous process.

The amount of vinyl acetate and alcohol solvent (typically, methanol) in the poly(vinyl acetate) paste which exits from the polymerization reactors can range from 1 to 70 weight % vinyl acetate and 2 to 50 weight % alcohol solvent.

Extruding devolatilization apparatus, as used herein, refers to one or more pieces of equipment which provide constant kneading and mixing of the paste. Examples of appropriate equipment for kneading and mixing viscous polymers include single and twin-screw extruders. Co-rotating or counter-rotating twin-screw extruders are preferred. However any device that kneads and mixes a viscous polymer and, at the same time, moves it through the device would be appropriate. A review of the use of extruders for the devolatilization of polymers can be found in "Devolatilization," by Joseph A. Biesenberger, in the *Encyclopedia of Polymer Science and Engineering*, 2d ed., Vol. 4, pages 745–751 (Wiley-Interscience, 1985.)

Other equipment can be used in combination with the extruding devolatilization apparatus. For example, an evaporator, such as a thin film evaporator or a wiped film evaporator, can be used at the entrance of the devolatilization apparatus to remove an initial portion of solvent and unreacted monomer before the paste passes to the vent zone of the extruding apparatus for additional purification of the poly(vinyl acetate). Alternatively, other devices such as a flash drum, can be used to concentrate the poly(vinyl acetate) paste before it is purified in the extruding apparatus.

Prior to entering the extruding devolatilization apparatus, the poly(vinyl acetate) paste is heated to a temperature above the glass transition temperature but below a temperature which will decompose the poly(vinyl acetate), in order to maintain the paste in a fluid form and vaporize the solvent and vinyl acetate. It is preferred to operate as close as possible to the temperature which decomposes the poly (vinyl acetate), without causing decomposition, in order to maximize devolatilization of the poly(vinyl acetate). Heating is achieved by external means, such as a heat exchanger, by heat transfer through the walls of the devolatilization apparatus, or shear heating of the viscous paste as it passes through the extruding devolatilization apparatus. The paste enters and is maintained in the devolatilization apparatus at temperatures between about 80 and 190° C.; preferably, at a temperature of about 140 to 160° C. This temperature is maintained throughout devolatilization of the poly(vinyl acetate) and dissolution of the purified poly(vinyl acetate) in a solvent. Although the decomposition temperature of poly (vinyl acetate) is reported to be 150° C., it was found that temperatures up to about 190° C. could be reached in the extruding apparatus without degradation of the poly(vinyl acetate). The temperature is preferably lowered after a homogeneous solution is obtained, following devolatilization and prior to exiting the extruding apparatus, in order to avoid flashing.

The extruding devolatilization apparatus preferably contains a single device which contains a flashing area and a mixing area. In the flashing area, solvent and unreacted monomer are removed from the poly(vinyl acetate) paste. In the mixing area, the substantially pure poly(vinyl acetate) melt, exiting from the last flashing area, is mixed and dissolved in a hydrolytic alcohol-containing solvent. The flashing area contains one or more vent zones in which solvent and unreacted monomer are vaporized and flashed through vent ports. The flashes are performed at atmospheric pressure or under vacuum. A low residence time within the flashing area is desired in order to maximize throughput. Residence time in the flashing area of current extruding apparatus typically ranges from about 0.3 to 10 minutes; preferably 0.3 to 5 minutes. Alternatively, the devolatilization apparatus can contain several devolatilization devices which are connected in series, each of which contains a flashing area in which a portion of the solvent and unreacted monomer contained in the poly(vinyl acetate) paste is removed. A substantially pure poly(vinyl acetate) melt is transferred to a mixing area of the last device in the series.

An example of an appropriate configuration for the extruding devolatilization apparatus is a single unit which contains a flashing area and a mixing area, and the flashing area contains three or more vent zones. The first one or more vent zones run at atmospheric pressure and the last vent zone runs at an absolute pressure of about 0.01 to 1 bar. The preferred configuration maximizes solvent and vinyl acetate removal at the first vent zone, using energy supplied external to the devolatilization apparatus. The viscosity of the polymer paste is thus increased so that viscous heating is an effective mode of heat generation. For the remaining vent zones, the heat energy to remove the solvent and monomer is supplied through a combination of viscous heat and heat transfer through the walls of the apparatus. Upon exiting the flashing area of the apparatus, a substantially pure poly (vinyl acetate) melt enters the mixing area of the apparatus.

This method of removing unreacted monomer and solvent is particularly useful for recycling vinyl acetate monomer and solvent to a polymerization reactor. Also, by using this method, the amount of vinyl acetate and solvent re-entering the polymerization reactor is known. As noted earlier, this is important in controlling the molecular weight of the poly (vinyl acetate).

The substantially pure poly(vinyl acetate) melt which exits the flashing area and enters the mixing area contains less than about 1 wt % vinyl acetate, based on the weight of poly(vinyl acetate); preferably less than 0.5 wt %, and most preferably less than 0.1 wt %. On exiting the flashing area, the melt forms a seal between the vent and the mixing areas of the devolatilization apparatus. The purified poly(vinyl acetate) can then be dissolved in a solvent using the same apparatus without affecting the devolatilization process in the flashing area. The solvent used to dissolve the poly(vinyl acetate) can be any known solvent for poly(vinyl acetate), such as methanol, ethanol, methyl acetate, or mixtures thereof. However, the solvent must contain the minimum amount of an hydrolytic alcohol required in the saponification reaction. Examples of hydrolytic alcohols are aliphatic alcohols having 1 to 4 carbon atoms, such as, methanol, ethanol, and butanol. For the saponification process, the amount of alcohol contained in the solution is at least one mol equivalent per reacted repeat unit in the poly(vinyl acetate); preferably 1 to 7 mol equivalents of alcohol per reacted repeat unit in the poly(vinyl acetate). This invention enables better control of the amount of alcohol in the poly(vinyl acetate) solution, thus providing a method for controlling the type of product formed in the saponification process.

FIG. 1 is a schematic drawing illustrating an embodiment of this invention. Poly(vinyl acetate) is produced in a series of polymerization reactors (10 and 20). The poly(vinyl acetate) effluent, known as poly(vinyl acetate) paste (21), containing poly(vinyl acetate), solvent, and unreacted vinyl acetate residue, from the polymerization process, is heated and the heated poly(vinyl acetate) paste (22) is transferred to the first vent zone (31) of the flashing area (34) of an extruding devolatilization apparatus (30). The poly(vinyl acetate) paste passes through each succeeding vent zone (31, 32, and 33), from which vinyl acetate and solvent are flashed and recycled (40) to a polymerization reactor (10). A purified poly(vinyl acetate) melt is transferred to a mixing area of the extruding devolatilization apparatus (35) where it is mixed and dissolved in a hydrolytic alcohol-containing solvent. It is then transferred to a saponification process (50).

The invention will be further clarified by a consideration of the following examples, which are intended to be purely exemplary of the use of the invention.

Examples 1–4 illustrate the use of an extruding apparatus for devolatilization of poly(vinyl acetate) to remove methanol. Example 5 illustrates the use of an extruding apparatus to devolatilize the poly(vinyl acetate) to remove methanol and vinyl acetate and to remix the purified poly(vinyl acetate) with methanol.

EXAMPLE 1

Figure 2:
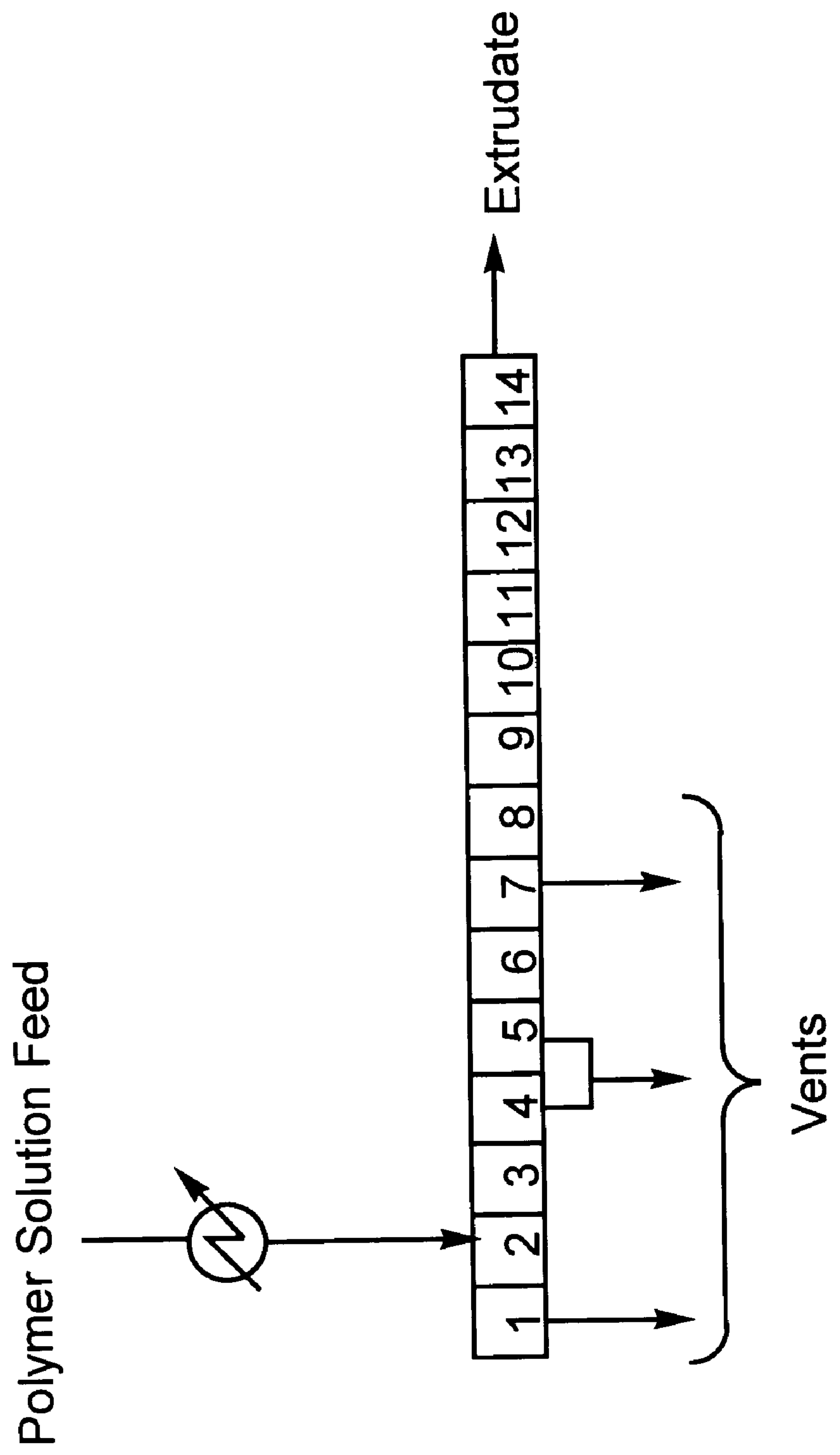
FIG. 2 is a schematic drawing of the extruding apparatus used in Examples 1–4.

A Werner & Pfleiderer ZSK-30 co-rotating twin screw extruder was used to demonstrate the process. The screw design of the extruder is shown in Table 1 and a schematic of the laboratory extruder is shown in FIG. 2. The extruder was equipped with four circular vents, each having a diameter of 60 mm, located in barrel 1, 4, 5, and 7 of the extruder. The vents in barrels 4 and 5 acted essentially as one vent zone, because the screw in the extruder was not designed to form a melt seal between them. The barrels of the extruder were heated using hot oil or hot water through the jackets of the barrels. The temperature settings of the external heaters are shown in Table 2. A polymeric solution, containing 38 wt. % poly(vinyl acetate) (Dp between 1000–1500) and 62 wt. % methanol, was fed through a heat exchanger to the extruder at 40 lb/hr; the temperature at the inlet to the extruder was 104° C. The melt temperature inside the extruder ranged from 96–189° C. Note that no vinyl acetate monomer was present in the sample, for ease of processing. The methanol was flashed off in the three vent zones, and the poly(vinyl acetate) melt was conveyed through the extruder. In this example, no additional methanol was added to the polymer melt, in order to evaluate the extent of devolatilization. The outlet composition (extrudate) was 99.0% poly (vinyl acetate), demonstrating the ability to remove the volatiles (in this case, methanol) from the feed stream. For this run, atmospheric pressure was maintained in the first two vents, and the pressure in the third vent was controlled at 0.74 bar by an external vacuum pump. The screw speed of the extruder was set at 150 RPM.

TABLE 1

Screw Designs

| Ex. | Barrel 1 | Barrel 2 | Barrel 3 | Barrel 4 | Barrel 5 | Barrel 6 | Barrel 7 |
|---|---|---|---|---|---|---|---|
| 1-4 | 2-42/42 | 3-42/42 | 1-45/5/42<br>1-90/5/28 | 1-20/10L<br>3-42/42 | 2-42/42 | 2-90/5/28<br>1-20/10L<br>1-42/42 | 2-42/42 |
| 5 | 2-42/42 | 3-42/42 | 1-45/5/42<br>1-90/5/28 | 1-20/10L<br>3-42/42U | 1-42/42U<br>2-42/21 | 2-90/5/28<br>1-20/10L<br>1-42/42 | 2-42/42 |

| Ex. | Barrel 8 | Barrel 9 | Barrel 10 | Barrel 11 | Barrel 12 | Barrel 13 | Barrel 14 |
|---|---|---|---|---|---|---|---|
| 1-4 | 1-42/42<br>1-20/10L<br>1-28/28 | 3-28/28 | 3-28/28 | 2-28/28<br>2-20/20 | 4-20/20 | 5-20/20 | 2-20/20<br>5-14/14 |
| 5 | 1-90/5/28 | 1-20/20 | 1-90/5/42 | 1-20/20 | 1-45/5/52 | 1-20/10 | 2-90/5/28 |

TABLE 1-continued

| Screw Designs | | | | | | |
|---|---|---|---|---|---|---|
| 1-20/10L | 4-45/5/14 | 1-20/10L | 3-45/5/14 | 1-90/5/42 | 4-TME | 3-20/10L |
| 1-28/28 | 1-90/5/42 | 1-20/20 | | 3-20/10L | 1-45/5/28 | 1-14/14 |

Notes:
The first number indicates the number of elements used; this is followed by a dash. If the next set of numbers is #/#, the screw element used was a screw bushing; the first number indicates the pitch of the element and the second number indicates its length in mm.
If the next set of numbers is #/#/#, the screw element is a kneading block. The first number indicates the orientation of the paddles (separated by 45° or 90°), the second number indicates the number of paddles, and the third number indicates the total length of the element in mm.
Screw bushings followed by an L, indicates a left handed element; all other elements are right handed.
U designates an "undercut" element.
TME indicates a turbine mixing element-the Werner & Pfleiderer designation for this element is: 8030-00. 12R225/014-00 (Part # 50002614)

TABLE 2

Temperature Settings for External Circulating Heaters (Oil or Water)

| | Heat Zone #1 | | Heat Zone #2 | | Heat Zone #3 | | Heat Zone #4 | | Heat Zone #5 | |
|---|---|---|---|---|---|---|---|---|---|---|
| Ex. | Barrel | Temp. °F. (°C.) | Barrel | Temp °F. (°C.) | Barrel | Temp °F. (°C.) | Barrel | Temp °F. (°C.) | Barrel | Temp °F. (°C.) |
| 1 | 1,2 | 390 (199) | 3–7 | 300 (149) | 8,9 | 300 (149) | 10–12 | 210 (99) | 13,14 | 205 (96) |
| 2 | 1,2 | 395 (202) | 3–5 | 300 (149) | 6–9 | 300 (149) | 10–12 | 210 (99) | 13,14 | 210 (99) |
| 3 | 1,2 | 395 (202) | 3–5 | 395 (202) | 6–9 | 350 (177) | 10–12 | 210 (99) | 13,14 | 210 (99) |
| 4 | 1,2 | 395 (202) | 3–7 | 300 (149) | 8,9 | 300 (149) | 10–12 | 210 (99) | 13,14 | 237* (114) |
| 5 | 1,2 | 360 (182) | 3–5 | 300 (149) | 6–10 | 325 (163) | 11,12 | 200 (93) | 13,14 | 104 (40) |

*Temperature was not controlled-high temperature was a result of viscous heating from conveying the poly(vinyl acetate) melt

EXAMPLE 2

Using the same experimental set-up as described in Example 1, 80 lb/hr of the polymeric solution (38 wt. % poly(vinyl acetate) and 62 wt. % methanol) was fed through the heat exchanger to the extruder; the inlet temperature to the extruder was 144° C. The settings of the external heaters are shown in Table 2. The melt temperatures inside the extruder ranged from 99–178° C. The screw speed of the extruder was increased to 250 RPM for stable operation with the higher feed rate. Again, the first two vent zones were operated at atmospheric pressure, while the third zone was run at 0.66 bar. No methanol was added after devolatilization. The extrudate composition was 99.2% poly(vinyl acetate).

EXAMPLE 3

Using the same conditions as Example 2, 80 lb/hr of the polymeric solution (38 wt. % poly(vinyl acetate) 62 wt. % methanol) was fed to the extruder. The inlet temperature of the solution was 143° C. and the extruder was operated at 400 RPM. The melt temperatures in the extruder ranged from 98–179° C.; the settings of the external heaters were set higher (see Table 2). Therefore, even though the range of temperatures is consistent with previous examples, the middle vent zones were substantially hotter. For example, in the 2$^{nd}$ vent zone, the melt temperature was 158° C. compared to 108° C. in Example 2, and in the third vent zone, the temperature was 159° C. compared to 137° C. in the Example 2. All three vent zones were operated at near atmospheric conditions (0.95–1.0 bar). Without vacuum applied in the vent zones, but with the higher temperature, the extrudate composition was 99.1% poly(vinyl acetate).

EXAMPLE 4

Using the same conditions as Example 1, 40 lb./hr of the poly(vinyl acetate)/methanol solution was fed to the extruder. The feed was heated to 152° C. before the flash in the first vent zone of the extruder. The first two vent zones were operated near atmospheric pressure, and the third was operated at 0.36 bar. The poly(vinyl acetate) product was produced at 99.4% solids. This product was re-dissolved (external to the extruder) to prepare a 15% poly(vinyl acetate)/methanol solution (by weight). The color and viscosity was compared to the original polymer solution. The whiteness (as measured by a transmission colorimeter) of the original feed solution was 94.84% and of the re-dissolved polymer solution was 93.14%. The viscosity (corrected for variations in the solution concentration) was 123 centipoise (cps) for the original solution and 117 cps for the re-dissolved solution. Both of these values are within the experimental errors of the technique, indicating that no polymer degradation had occurred during the devolatilization process. The melt temperature inside the extruder ranged between 110–187° C. No degradation occurred, even though the temperature inside the extruder was above the published decomposition temperature of 150° C. for poly (vinyl acetate) (*Polymer Handbook*, 3$^{rd}$ ed., edited by J. Brandrup and E. H. Innergut. Wiley, 1989, p.V/71).

EXAMPLE 5

Figure 3:
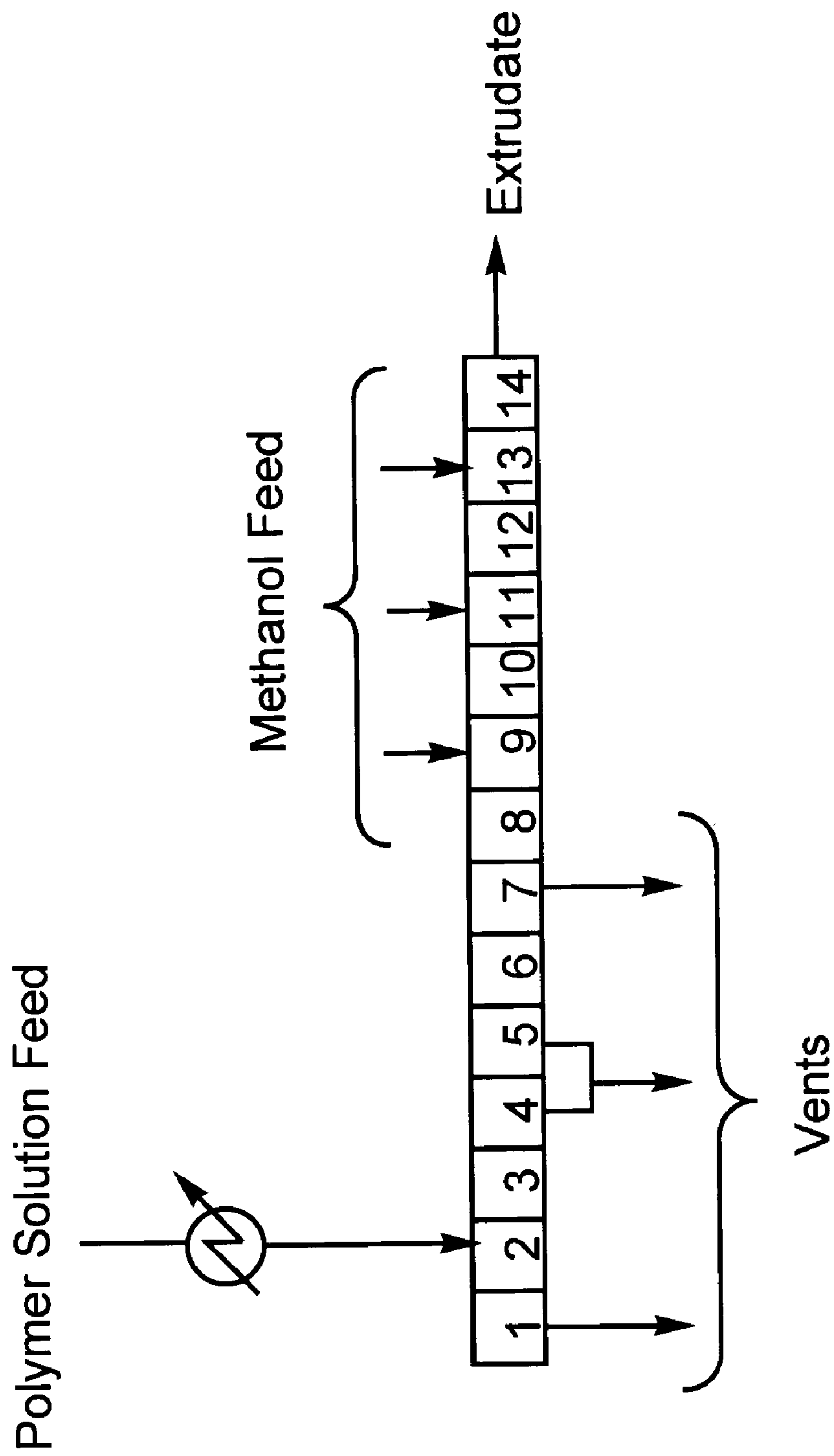
FIG. 3 is a schematic drawing of the extruding apparatus used in Example 5.

In this example, both devolatilization and re-mixing with solvent was tested. The extruder configuration of FIG. 2 was modified as shown in FIG. 3. In addition to the vent zones, three injection zones were added in barrels 9, 11, and 13. Methanol was injected at the following rates: 3.1 lb/hr in the first injector, 7.6 lb/hr in the second injector and 25.7 lb/hr through the third injector. The feed solution contained 40 wt. % poly(vinyl acetate), 40.2 wt. % vinyl acetate, and 19.8 wt. % methanol. Forty lb/hr of this feed solution was fed through the heat exchanger to the extruder; the inlet temperature varied between 159–161° C. The first vent zone of the extruder was operated at atmospheric pressure, the second vent zone at 0.11 bar, and the third vent zone at 0.01 bar. The system was operated in this mode for 2.5 hours. During this period, the extrudate was homogeneous and clear. The poly(vinyl acetate) composition varied between 39.9 wt% and 41.1 wt. %. The vinyl acetate composition was <0.4 wt% for the entire run; the remainder of the extrudate was methanol. In this example, the removal of the monomer, and the re-addition of reactant, in this case methanol, for the next phase was demonstrated. The extrudate (40 wt. % poly(vinyl acetate) and 60 wt. % methanol) was acceptable for processing in the saponification section of a poly(vinyl alcohol) plant. The condensate from the vents (67% vinyl acetate and 33% methanol) was acceptable for direct feed to the polymerization section of a poly(vinyl acetate) plant (along with make-up vinyl acetate to account for the monomer reacted to form poly(vinyl acetate).)

We claim:

1. A continuous process for the preparation of poly(vinyl alcohol) from poly(vinyl acetate) paste, said poly(vinyl acetate) paste comprising poly(vinyl acetate), vinyl acetate monomer, and solvent, the steps which comprise:

a) conveying the poly(vinyl acetate) paste to an extruding devolatilization apparatus comprising a flashing area and a mixing area, at a temperature above the glass transition temperature of the poly(vinyl acetate) and below a temperature that causes degradation or decomposition of the poly(vinyl acetate);

b) conveying the poly(vinyl acetate) paste into the flashing area;

c) flashing the vinyl acetate and solvent from the flashing area to produce a substantially pure poly(vinyl acetate) melt containing less than about 1 wt % vinyl acetate, based on the weight of poly(vinyl acetate);

d) conveying the substantially pure poly(vinyl acetate) melt from the flashing area into the mixing area of the extruding devolatilization apparatus such that the poly (vinyl acetate) melt forms a seal between the flashing area and the mixing area;

e) mixing the substantially pure poly(vinyl acetate) melt with a hydrolytic alcohol-containing solvent to form a homogenous poly(vinyl acetate) solution; and f) conveying the homogeneous poly(vinyl acetate) solution to a saponification process and effecting saponification.

2. The process of claim 1 wherein the extruding devolatilization apparatus comprises one or more extruders and the solvent contained in the poly(vinyl acetate) paste is methanol or tert-butanol.

3. The process of claim 1 wherein the extruding devolatilization apparatus comprises a co-rotating or counter-rotating twin-screw extruder or a combination thereof.

4. The process of claim 1 wherein the substantially pure poly(vinyl acetate) melt contains less than 1 wt % solvent or vinyl acetate monomer, based on the weight of poly(vinyl acetate).

5. The process of claim 1 wherein the substantially pure poly(vinyl acetate) melt contains less than 0.5 wt % solvent or vinyl acetate monomer, based on the weight of poly(vinyl acetate).

6. The process of claim 1 wherein the substantially pure poly(vinyl acetate) melt contains less than 0.1 wt % of solvent or vinyl acetate monomer, based on the weight of poly(vinyl acetate).

7. The process of claim 1, wherein the temperature ranges from 80° to 190° C.

8. The process of claim 1, wherein the temperature ranges from about 140° to 160° C.

9. The process of claim 1 wherein the flashed vinyl acetate and solvent are recycled to a polymerization reactor.

10. The process of claim 1 wherein the substantially pure poly(vinyl acetate) melt is dissolved in a hydrolytic alcohol-containing solvent comprising 1 to 7 mol equivalents of a hydrolytic alcohol per repeat unit in the poly(vinyl acetate).

* * * * *